United States Patent [19]
Rajamani et al.

[11] Patent Number: 5,636,507
[45] Date of Patent: Jun. 10, 1997

[54] COORDINATED FUEL-AIR CONTROLLER FOR GAS TURBINE WITHOUT LOAD FEEDBACK

[75] Inventors: Ravi Rajamani, Schenectady; Bruce G. Norman, Charlton, both of N.Y.

[73] Assignee: General Electric Company, Schenectady, N.Y.

[21] Appl. No.: 537,599

[22] Filed: Oct. 2, 1995

Related U.S. Application Data

[63] Continuation-in-part of Ser. No. 236,972, May 2, 1994, Pat. No. 5,487,265.
[51] Int. Cl.$^6$ ............................................. F02C 9/50
[52] U.S. Cl. ............................... 60/39.03; 60/37.27
[58] Field of Search ........................... 60/39.03, 39.27, 60/39.281, 39.29

[56] References Cited

U.S. PATENT DOCUMENTS

| | | | |
|---|---|---|---|
| 3,584,459 | 6/1971 | Amann | 60/39.23 |
| 3,899,886 | 8/1975 | Swick | 60/223 |
| 4,529,887 | 7/1985 | Johnson | 290/40 R |
| 4,550,565 | 11/1985 | Ozono | 60/39.182 |
| 5,487,265 | 1/1996 | Rajamani et al. | 60/39.03 |

*Primary Examiner*—Louis J. Casaregola
*Attorney, Agent, or Firm*—Donald S. Ingraham

[57] ABSTRACT

A method of minimizing undesirable emissions from and acoustic pressure oscillations in a gas turbine includes the step of coordinating modulation of turbine fuel and air supply signals to maintain the fuel air ratio (FAR) within a selected range. Coordination of the modulation of fuel and air supply signals includes the steps of producing a turbine fuel supply control signal in correspondence with a turbine speed error signal, generating a coordinated turbine exhaust temperature error signal by modifying a preliminary turbine exhaust temperature error signal in correspondence with the derivative of the speed error signal, and producing a turbine air supply control signal from the coordinated turbine exhaust temperature error signal; the coordinated turbine exhaust temperature error signal provides coordination between the turbine fuel supply signal and the turbine air supply signal so as to maintain the fuel-air ratio of the combustible mixture being fed to the turbine within the selected range.

15 Claims, 1 Drawing Sheet

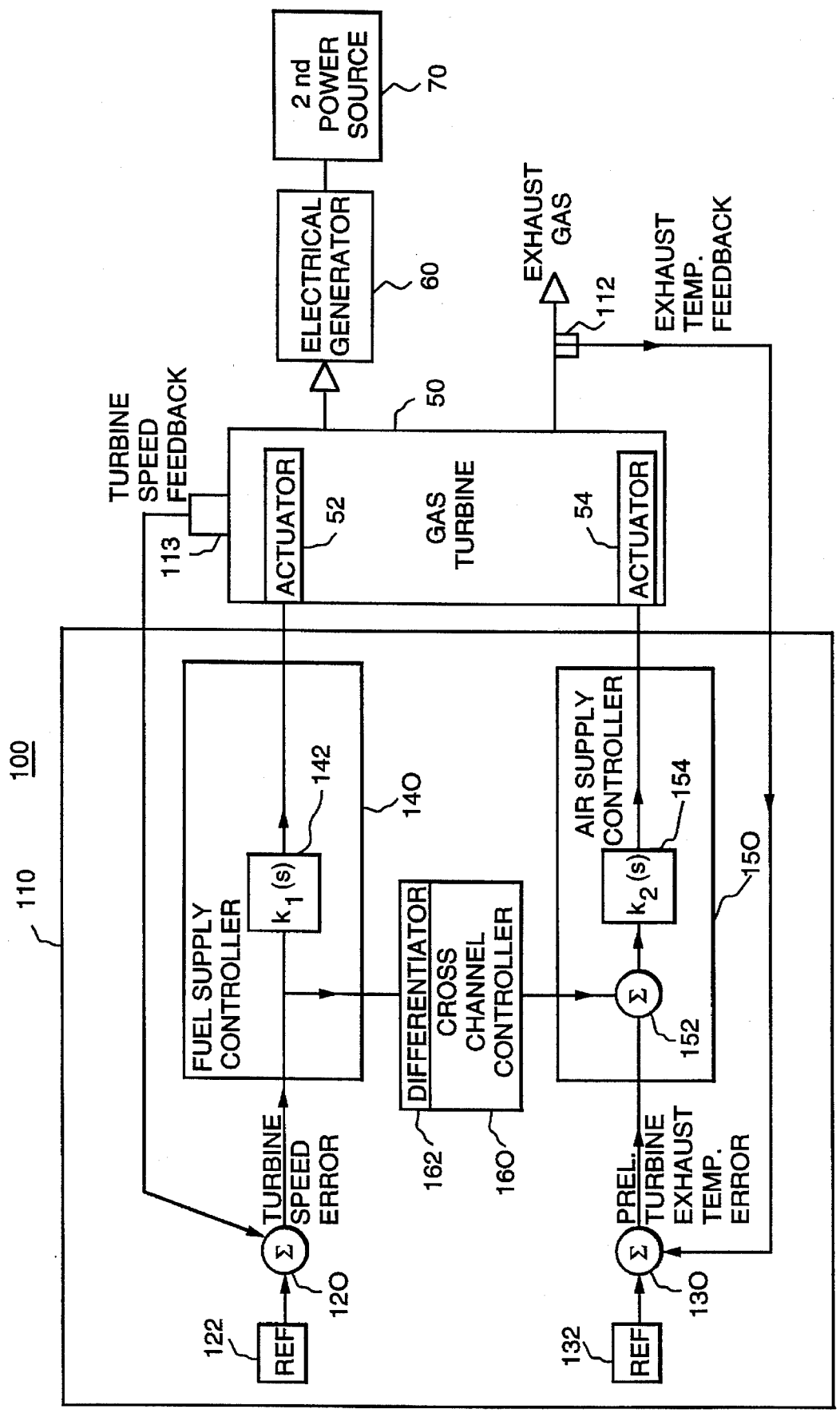

COORDINATED FUEL-AIR CONTROLLER FOR GAS TURBINE WITHOUT LOAD FEEDBACK

RELATED APPLICATIONS

This application is a continuation-in-part of application Ser. No. 08/236,972, filed 2 May 1994 and allowed 9 Aug. 1995, (U.S. Pat. No. 5,487,265), which application is assigned to the assignee herein and incorporated by reference.

BACKGROUND OF THE INVENTION

This invention relates generally to gas turbines and in particular to methods and means for operating a gas turbine that does not have means of directly determining turbine power output (e.g., does not use generator load feedback) to maintain a substantially constant fuel-air ratio during changing load conditions.

Gas turbines coupled to electric generators are commonly used in power generation service. As gas turbines are capable of being quickly started and brought up to speed for operational loading, such units are generally considered more effective to use to handle grid peak loads (that is power demand spikes above a more constant grid base load) than steam turbine systems. Thus gas turbines are commonly used in a changing-load environment, in which they must respond to numerous increases and decreases in electric power demand.

It is desirable to optimize operation of a gas turbine in order to reduce undesirable emissions from the combustion process in the turbine. For example, the gas turbine combustion process results in generation of, among other things, nitrogen oxides ($NO_x$), unburnt hydrocarbons, and carbon monoxide (CO). Such undesirable emissions can be minimized through control of the turbine's reaction zone temperature; this temperature in turn is well correlated with the fuel-air ratio (FAR) of the combustible mixture being fed into the combustion chamber of the turbine. Controlling the turbine's FAR thus effects overall operation of the combustor and is an important factor in optimizing turbine performance.

Current gas turbine control systems typically employ a decentralized control strategy in which fuel supply to the turbine and air supply to the turbine are controlled by reference to different measured turbine performance parameters. For example, in a typical gas turbine controller fuel supply to the turbine is controlled primarily via a feedback loop that seeks to match turbine power output with the electrical load demand on the generator driven by the turbine. This feedback is typically through turbine speed, with a speed error signal (that is variation of the measured turbine speed with a reference (or set point) value) being processed to increase or decrease fuel supply to the turbine as appropriate. Air supply to the turbine in such a system is typically determined by the compressor inlet geometries which are controlled based on the error between actual turbine exhaust temperature and a reference temperature value; the compressor inlet guide vanes are positioned to increase or decrease air flow into the turbine as necessary to obtain the optimal exhaust temperature. Thus, a change in load on the turbine results in an immediate change in fuel flow to the turbine, leading to a change in the power output and exhaust temperature, which situation results in the controller commanding the inlet guide vanes to open to increase air flow to the turbine.

Control of the gas turbine is further complicated when the gas turbine drive shaft is coupled to a generator that is also receiving rotational energy input from another source, such as a steam turbine. In this arrangement, the generator power output cannot be used as an estimate of the mechanical power output of the gas turbine alone.

In gas turbine control systems commonly in use, efforts to reduce FAR variations resulting from the lag between fuel supply control and air supply control (that is, fuel leads air in the current control system) by simply changing control constants and gains have generally been unsuccessful. For example, attempts to reduce the lag by increasing the gain on the air flow loop, reducing the gain on the fuel loop, or both, generally puts the control system into a response region which is highly oscillatory and closer to the instability region.

It is desirable to have a control system that controls fuel and air flow to the turbine in a coordinated manner during transient and steady state operations so as to maintain a substantially constant FAR.

SUMMARY OF THE INVENTION

In accordance with this invention, a method for operating a gas turbine to reduce undesirable emissions, such as nitrogen oxides ($NO_x$) and carbon monoxide (CO), and to reduce acoustic pressure oscillations in the combustion process includes the step of coordinating the modulation of the turbine fuel supply and air supply signals so as to maintain the fuel-air ratio (FAR) of the fuel air combustible mixture supplied to the turbine substantially constant at any given operating condition of the turbine in which both fuel and air supply to the turbine is modulated. Fuel-air ratio values are ratios of fuel flow in pounds/sec and air flow in pounds/sec.

In particular, coordinating the modulation of fuel and air supply signals to maintain the FAR substantially constant further includes the steps of generating a speed error signal by comparing actual turbine speed with a reference value; generating a preliminary turbine exhaust temperature error signal by comparing actual turbine exhaust temperature with a reference temperature; producing a turbine fuel supply (or fuel flow) control signal in correspondence with the speed error signal; generating a coordinated turbine exhaust temperature error signal by modifying the preliminary turbine exhaust temperature error signal in correspondence with the derivative of the turbine speed error signal; and producing a turbine air supply (or air flow) control signal in correspondence with the coordinated turbine exhaust temperature error signal. The use of the coordinated turbine exhaust temperature error signal provides coordination between the turbine fuel supply signal and the turbine air supply signal so as to maintain the FAR of the combustible mixture fed to the turbine substantially constant during transients over the normal loaded operating conditions of the gas turbine.

The step of generating a coordinated turbine exhaust temperature error signal includes the step of processing the derivative of the speed error signal in accordance with a time-delay transfer function to generate a temperature error modification signal. The temperature error signal is typically expressed in degrees temperature error such that the temperature error signal, when summed with the preliminary turbine exhaust temperature error, provides the coordinated turbine exhaust temperature error signal.

The fuel supply signal is typically applied to an actuator to adjust the fuel stroke reference (e.g., the valve setting to control mass of fuel delivered to the turbine per unit time) in the turbine fuel supply system and the air supply control signal is applied to an actuator to adjust the inlet guide vane angle of the turbine.

A low emission gas turbine control system includes a turbine control unit coupled to a gas turbine to receive a plurality of turbine operating parameter signals other than turbine power output and is further coupled to apply selected respective regulatory function control signals to the gas turbine. The turbine control unit includes a coordinating processor unit having a fuel supply controller and an air supply controller that generate respective signals to control fuel and air supply actuators for the turbine. The processor unit further includes a first processing means coupled to the fuel supply controller for comparing a reference turbine speed signal and an actual turbine speed signal to generate a turbine speed error signal and a second processing means coupled to the air supply controller for comparing a reference turbine exhaust temperature signal and an actual turbine exhaust temperature signal to generate a preliminary turbine exhaust temperature error signal. The processor unit also includes a time compensated cross channel controller having a differentiator function and that is adapted to process the derivative of the speed error signal to generate a temperature error modification signal in accordance with a time compensation transfer function. The cross channel controller is coupled to the fuel supply controller and air supply controller; the air supply controller further includes means for modifying the preliminary temperature error signal with the temperature error modification signal generated by the cross channel controller to generate a coordinated turbine exhaust temperature error signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawing in which like characters represent like parts throughout the drawing, and in which:

The FIGURE is a block diagram of a low emission gas turbine control system in accordance with one embodiment of this invention.

DETAILED DESCRIPTION OF THE INVENTION

A low emission gas turbine control system 100 comprises a turbine control unit 110 coupled to a gas turbine 50 as illustrated in FIG. 1. Gas turbine 50 comprises a machine in which a combustible mixture of fuel and air is burned in a combustion chamber (not shown); the energy liberated by the burning of the combustible mixture is at least partially extracted by the expanding gas mixture passing through turbine blades and causing the blades to turn a drive shaft. The turbine typically is coupled via the drive shaft to a load, such as an electrical generator 60. Generator 60 may also be further coupled to a second power source 70, such as a steam turbine or the like, as might be found in a combined-cycle generating plant arrangement.

The burned gas mixture is exhausted from the turbine and typically vented used in a heat exchanger to produce steam for running the steam turbine. The temperature of the exhaust gas is a function of the temperature in the reaction zone in the combustion chamber of the turbine, and is typically measured by a temperature sensor 112 comprising a set of thermocouples or the like and that is in turn coupled to turbine control unit 110.

The power output of turbine 50 is delivered to generator 60 and is used to drive generator 60 to meet the electrical load on the generator. In an arrangement in which second power source 70 is also driving generator 60, the generator load output does not necessarily provide an accurate measure of the mechanical power developed by gas turbine 50, thus there is typically no turbine power output signal, that is, a signal that corresponds directly with mechanical power delivered by the turbine, such as generator electrical power when only one turbine drives the generator (in arrangements in which gas turbine 50 alone drives generator 60, generator electrical (power) output does provide a measure of turbine power output and is available for use in the turbine controller). Turbine performance (e.g., power output) is inferred from parameters such as turbine speed, and such parameters are used to regulate turbine operation through control signals generated in controller 110. Gas turbine 50 speed is detected by one or more speed sensors 113 which in turn are coupled to control unit 110.

Control unit 110 comprises a speed error circuit 120; a turbine exhaust temperature error circuit 130; a fuel supply controller 140 coupled to speed error circuit 120; an air supply controller 150 coupled to exhaust temperature error circuit 130; and a cross channel controller 160 coupled to receive a turbine speed error signal from speed error circuit 130 and to air supply controller 150. Fuel supply controller 140 and air supply controller 150 are each also respectively coupled to gas turbine 50 to control respective actuators governing admission of fuel and air to form the combustible mixture admitted to the combustion chamber of turbine 50. Fuel supply controller 140 and air supply controller 150 comprise means for controlling fuel flow and air flow into the turbine combustor, respectively.

Speed error circuit 120 comprises a processor for generating a turbine speed error signal; such a signal is generated by comparison of the actual value of the measured parameter (actual turbine speed in this instance) with a reference (or set point) value for turbine speed. The speed error circuit 120 is coupled to receive the actual turbine speed signal from sensors 113 (such a signal may be filtered or the like (filter circuit not shown)) to provide the desired quality of signal. The actual turbine speed output signals are compared in speed error circuit 120 with a reference value for turbine speed; a speed reference processor 122 provides the reference (or set point) value for a given operational environment (such as to deliver a given amount of electrical power), and can be selected by the turbine operating system (e.g., operator selection or programmed response). The turbine speed error signal generated by speed error circuit 120 is passed to fuel supply controller 140.

Turbine exhaust temperature error circuit 130 comprises a processor for generating a preliminary turbine exhaust error signal; such a signal is generated by comparison of the actual value of the turbine exhaust temperature with a reference (or set point) value for turbine exhaust temperature. The reference value of exhaust temperature error is determined in a temperature reference processor 132 and is typically a function of various parameters such as turbine compressor discharge pressure, ambient temperature, and the like. The turbine exhaust temperature error circuit 130 is coupled to receive the actual turbine exhaust temperature signal from sensor 112. The error signal generated by turbine exhaust temperature error circuit 130 is referred to herein as the "preliminary" turbine exhaust temperature error signal as it has not yet been modified in accordance with this invention to provide desired coordination between the fuel supply control signal generated by fuel supply controller 130 and air supply control signal generated by air supply controller 150. Speed error circuit 120 is coupled to air supply controller 150 so that the preliminary turbine exhaust temperature error signal is passed to controller 150.

Fuel supply controller 140 typically comprises a control loop regulator 142, typically a proportional algorithm control loop regulator, in which the turbine speed error signal is processed in accordance with a selected transfer function (denoted as $K_1(s)$ in the Figure) to generate a fuel flow signal. Thus, for example, a speed error signal indicating the turbine had an actual speed less than the reference (or set point) speed is processed in fuel supply controller 140 to generate a corresponding fuel flow signal to increase fuel flow to the turbine in proportion to the error between the reference and actual turbine speed. Regulatory function processor 142 is typically coupled to an actuator 52 that controls the fuel control valve stroke (e.g., position of the valve that meters fuel flow) in the fuel supply system of the turbine so that fuel flow to the turbine combustor corresponds to the fuel flow control signal generated in control loop regulator 142.

In accordance with this invention, cross channel controller 160 is coupled to fuel supply controller 140 to receive the turbine speed error signal therefrom. Cross channel controller 160 typically comprises a digital controller that is adapted to process the turbine speed error signal in correspondence with a selected transfer function so as to generate a temperature error modification signal. The temperature error modification signal is combined in air supply controller 150 with the preliminary turbine exhaust temperature error signal to coordinate fuel and air supply signals to maintain a substantially constant FAR following a disturbance from a steady state condition, such as a commanded change in load or uncommanded change in load. The coordination of fuel and air supply signals as a consequence of the application of signals generated by cross channel controller 160 minimize transient excursions in the FAR by providing a first order correction to minimize the effect of the disturbance.

Cross channel controller further comprises a differentiator 162, that is a circuit adapted to determine the derivative (i.e., d/dt) of the turbine speed error signal. The derivative of the speed error signal is processed by controller 160 in accordance with the transfer function as further noted herein. In particular, the derivative signal may commonly be filtered to reduce noise effects on system operation. In the system as illustrated in the Figure, determination of turbine loading is sensed by turbine speed error as there is no readily available measurement of turbine mechanical power output determinable from the generator load output due to the second power source 70 also driving generator 60. Development of the temperature error modification signal thus necessitates determining the nature (sign and magnitude) of changes in the turbine speed error signal. For design reasons, typically the reference turbine speed 122 is selected to have a value in excess of 100% so that in steady state operation some non-zero turbine speed error signal exists that is processed by fuel supply controller to govern the position of fuel supply actuator 52. Differentiator 162 enables the use of such a design (that is, having a non-zero steady state turbine speed error signal) by driving the temperature error modification signal to zero except when the turbine speed error signal is changing.

In one embodiment of the invention, the temperature error modification signal is expressed as degrees temperature error (e.g., degrees Fahrenheit) so that it is readily combined with the preliminary turbine exhaust temperature error signal generated by exhaust temperature error circuit 130. The particular transfer function applied to the speed error signal is selected to provide the appropriate time compensation to coordinate fuel and air supply control signals. For example, the signal generated by cross channel controller 160 provides a conversion of the speed error signal to a corresponding degrees of temperature error signal that, when added to the preliminary temperature error signal generated by temperature error circuit 130, provides the desired time compensation (e.g., reduction in lag time or time delay) between the fuel supply control signal and the air supply control signal so as to minimize transient excursions in the FAR. The actual value of the FAR for various operating conditions varies as a function of operating point, that is, power output, fuel type, fuel preparation, and the like.

In accordance with this invention, controller 110 comprising cross channel controller 160 is adapted to provide a fuel schedule (e.g., commanded fuel flow) to the turbine combustor in proportion to non-zero speed error and compensating error signals so that air and fuel supply control signals respond in synchrony in the event of a disturbance. This coordinated response of fuel and air supply signals minimizes FAR transients and thus maintains FAR substantially constant following a disturbance; the actual amount of the transient variation is a function of the magnitude of the disturbance and the choice of any clipping limitation of the cross channel controller temperature error modification signal as noted below.

The particular transfer function used for any given turbine installation is selected in order to match transient responses of air and fuel channels for the particular configuration of that turbine is scheduled to One example of a transfer function used in cross channel controller 160 can be expressed as follows:

$$H(s) = A\ s_{spd}/(Bs+1)$$

wherein:

H(s) represents the transfer function;

A represents the gain;

B represents the time constant; and s represents the Laplace variable.

This transfer function effects the desired control of the turbine by modifying the temperature error in a proportional fashion and as a function of time. In simplistic terms, the amount of correction is governed by "A" (the gain) and the time at which the correction is applied is governed by "B", the time constant. The presence of the derivative of the turbine speed error signal causes a correction signal to be generated only when the turbine speed error signal is changing. Other transfer functions, such as (As+1)/[(Bs+1) (Cs+1)] (in which C represents another time constant, e.g., as used for filtering and time compensation) can also be used as appropriate for particular installations. The derivative signal is frequently filtered to provide desired system operation. Regardless of the particular transfer function used, the cross channel controller generates a temperature error signal that, when introduced with the preliminary turbine exhaust temperature error signal, will generate a coordinated temperature error signal that provides the coordination of turbine fuel and air supply to minimize transients in the FAR. Further, with each transfer function H(s), clipping limitations are typically placed on the output signal so that the turbine is protected from too great an instantaneous change in air supply control signal. For example, the transfer function is typically selected such that the clipped (or limited) temperature error modification signal has a maximum value (e.g., 25° F. in the example described herein).

Air supply controller comprises a summing circuit 152 that is coupled to respectively receive the preliminary turbine exhaust temperature error signal generated by error circuit 130 and the temperature error modification signal so as to modify the preliminary turbine exhaust temperature error signal with the temperature error modification signal. Typically such modification is effected by adding the two signals together (e.g., when the temperature error modification signal is expressed in degrees temperature error) and the resultant modified signal generated comprises the coordinated turbine exhaust temperature error signal (so called as the temperature error signal now has been modified to reflect a coordinating input from the speed error signal).

Air supply controller further comprises a regulatory function processor 154 (typically a proportional-integral controller) that is coupled to receive the coordinated turbine exhaust temperature error signal and to process the coordinated temperature error signal in accordance with a selected transfer function (denoted as $K_2(s)$ in the Figure) to generate an air supply signal. Thus, for example, a coordinated exhaust temperature error signal indicating the turbine was rising above the reference (or set point) temperature is processed in air supply controller 150 to generate a corresponding air supply signal to increase air flow to the turbine to return the turbine exhaust temperature to the reference value. Air supply controller 150 is coupled to air flow actuator 54 so that the air flow control signal is applied to control the inlet guide vane angle of turbine 50.

In operation, the cross channel controller of the present invention provides for improved turbine performance by reducing acoustic pressure oscillations in the combustion process and by reducing undesirable emissions of nitrogen oxide and carbon monoxide from gas turbine 50, especially during transient conditions when the turbine is responding to a changed load on the electric generator. The FAR is maintained substantially constant within the selected range during transient operation when both fuel supply and air supply to the turbine is actively modulated; in most turbines, at low load conditions, the air supply is held constant (that is, the inlet guide vanes are not moved and only fuel supply is modulated), a situation that leads to large variations in FAR as fuel supply is varied. Of greatest interest in turbine operation, however, is turbine operation under substantially loaded conditions, such as when electrical load on the turbine is changed. In this regime of operation, both turbine fuel and air supply is modulated and, in accordance with this invention, the FAR during these transient operations can be maintained relatively constant. By way of example and not limitation, for one particular fuel and a particular low emission combustor arrangement, steady state FARs are maintained within a range of 0.007 at full speed, no-load conditions (that is, turbine is ready for loading), to 0.035 at base load conditions (that is, turbine is full loaded). These values will vary as a function of the fuel and fuel preparations used.

Maintaining a substantially constant FAR, over a range of turbine loading conditions and especially during transient operation, provides a reduction in the magnitude of acoustic pressure oscillation and in emissions from the gas turbine. In one example, modeling indicates that coordinated control of modulation of fuel and air supplies to the turbine in accordance with this invention results in a FAR variation that reduced transient magnitudes by about one-fourth the magnitude of FAR variation that would be seen in a controller that does not have cross channel fuel and air supply control of the present invention. Use of coordinated modulation of fuel and air supply signals to reduce transient variations also reduces peak acoustic pressure in oscillations in the combustor. This invention further provides reduced emissions of undesirable substances (e.g., nitrogen oxides, unburnt hydrocarbons, and carbon monoxide, and the like) over a non-coordinated control system by minimizing variations in the FAR during transient operations.

The method of the present invention can be illustrated by the example of an increased electrical load being placed on the generator driven by gas turbine 50. The electrical load initially causes the turbine to slow, resulting in a drop in frequency that is detected by speed sensor 114; reduced turbine speed also results in reduce air flow through the turbine. The actual turbine speed signal is compared with a selected turbine reference speed (such as would correspond with a desired frequency output of the electrical generator, e.g., 60 Hz) in speed error circuit 120 to generate a turbine speed error signal. The speed error signal begins to increase from its steady state value and is processed in fuel supply controller to produce a turbine fuel flow signal that provides for increased fuel flow to the turbine (which will result in more energy being released during combustion of the fuel-air mixture and the turbine returning to the selected reference speed). The actual turbine exhaust temperature as detected by sensor 112 is compared with a selected reference value for exhaust temperature (the reference temperature is determined based on various physical parameters in the turbine, such as compressor discharge pressure, ambient temperature, and the like) in turbine exhaust temperature error circuit 130 to generate the preliminary turbine exhaust temperature error signal that is supplied to air supply controller 150. In the increased load example, the actual turbine exhaust temperature would not change significantly (that is, as a result of the decreased air flow resulting from the initial speed reduction) until additional fuel (as a result of the change in the fuel supply signal) is added to combustible mixture being fed to the turbine. The exhaust temperature rises as the FAR becomes more rich due to increased fuel flow and decreased compressor air flow, and the reaction zone temperature in the combustion chamber of the turbine increases.

In accordance with the method of the present invention, a coordinated turbine exhaust temperature error signal is generated by modifying the preliminary turbine exhaust temperature signal with a temperature error modification signal generated by cross channel controller 160 immediately upon detection of the change in turbine speed. The derivative of the speed error signal is processed in accordance with the selected transfer function such that the resultant temperature error modification signal, when added to the preliminary turbine exhaust temperature error signal provides correspondence between the fuel supply signal and the air supply signal so as to maintain the FAR in the mixture supplied to the turbine substantially constant. The use of the modified speed error signal to influence the air supply signal enables coordinated control of the fuel and air supply signals so that little or no lag exists between respective air and fuel supply signals to compensate for a transient condition in turbine operation. The device and method of the present invention thus provide means to maintain a turbine FAR substantially constant in turbine operating conditions in which fuel and air flow to the turbine is modulated by the controller.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A control system for a gas turbine in an electrical generation system, the control system being adapted for providing reduction of undesirable emissions from and acoustic pressure oscillations in a gas turbine in which fuel and air supply is modulated to provide a combustible mixture of fuel and air such that a substantially constant fuel-air ratio is maintained over a range of operating conditions, the control system comprising:

a turbine control unit coupled to a gas turbine to receive a plurality of respective turbine operating parameter signals other than a turbine power output signal, said turbine control unit further being coupled to said gas turbine so as to apply respective regulatory function control signals thereto; said turbine control unit comprising:

a fuel supply controller;

an air supply controller a first processing means for comparing a reference turbine speed signal and an actual turbine speed signal to generate a turbine speed error signal, said first processing means being coupled to said fuel supply controller;

a second processing means for comparing a reference turbine exhaust temperature signal and an actual turbine exhaust temperature signal to generate a preliminary turbine exhaust temperature error signal, said second processing means being coupled to said air supply controller; and a time compensated cross channel controller having a differentiator function, said cross channel controller being coupled to said fuel supply controller and said air supply controller and adapted for processing the time derivative of said turbine speed error signal in correspondence with a selected time compensated transfer function to generate a temperature error modification signal.

2. The system of claim 1 wherein said turbine speed error signal generated by said first processing means corresponds to the comparison of only said actual turbine speed signal and said reference turbine speed signal.

3. The system of claim 2 wherein said time compensated cross channel controller is adapted to process said turbine speed error signal in accordance with a transfer function H(s) selected from the group consisting of the following functions:

$$H(s)=A/(Bs+1); \text{ and } H(s)=(As+1)/[(Bs+1)(Cs+1)]$$

wherein:

H(s) represents the transfer function;

A represents the gain;

B represents a first time constant;

s represents the Laplace variable; and

C represents a second time constant.

4. The system of claim 2 wherein said air supply controller further comprises means for modifying said preliminary temperature error signal with said temperature error modification signal to generate a coordinated turbine exhaust temperature error signal.

5. The system of claim 4 wherein said means for modifying said preliminary temperature error signal comprises a summing circuit coupled to receive said preliminary turbine temperature error signal and said temperature error modification signal so as to sum said two signals to generate said coordinated turbine exhaust temperature error signal.

6. The system of claim 1 wherein said fuel supply controller is adapted to process said turbine speed error signal in accordance with a fuel controller transfer function so as to generate a fuel supply control signal, said fuel supply controller being coupled to fuel supply actuators so as to provide said fuel supply control signal thereto.

7. The system of claim 1 wherein said undesirable emissions comprise nitrogen oxides ($NO_x$) and carbon monoxide (CO).

8. The system of claim 1 wherein said air supply controller is coupled to an inlet guide vane angle actuator in said turbine.

9. A method for operating a gas turbine in an electrical generation system so as to reduce undesirable emissions and acoustic pressure oscillations, the method comprising the step of coordinating the modulation of respective turbine fuel supply and air supply signals so as to maintain the fuel-air ratio of the fuel air combustible mixture supplied to the turbine substantially constant over a range of operating conditions of said gas turbine in which both fuel and air supply to said turbine is modulated, coordinating the modulation of turbine fuel supply and air supply further comprising the steps of:

generating a turbine speed error signal by comparing actual turbine speed with a turbine reference speed;

generating a preliminary turbine exhaust temperature error signal by comparing actual turbine exhaust temperature with a selected turbine exhaust reference temperature;

producing a turbine fuel supply control signal in correspondence with said speed error signal;

generating a coordinated turbine exhaust temperature error signal by modifying said preliminary turbine exhaust temperature error signal in correspondence with a temperature error modification signal, said temperature error modification signal being generated in a cross channel controller adapted to process a time derivative value of said turbine speed error signal in accordance with a time compensated transfer function; and producing a turbine air supply signal from said coordinated turbine exhaust temperature error signal;

said coordinated turbine exhaust temperature error being time-delayed with respect to said turbine fuel supply control system so as to maintain the fuel-air mixture in said gas turbine substantially constant.

10. The method of claim 9 wherein the step of processing said speed error signal in said cross channel controller is performed in accordance with a transfer function H(s) selected from the group consisting of the following functions:

$$H(s)=A/(Bs+1); \text{ and } H(s)=(As+1)/[(Bs+1)(Cs+1)]$$

wherein:

H(s) represents the transfer function;

A represents the gain;

B represents a first time constant;

s represents the Laplace variable; and

C represents a second time constant.

11. The method of claim 10 wherein said temperature error modification signal is expressed as degrees temperature error and the step of generating said coordinated turbine exhaust temperature signal comprises adding said temperature error modification signal and said preliminary turbine exhaust temperature error signal.

12. The method of claim 11 wherein said temperature error modification signal has a clipped maximum value.

13. The method of claim 9 further comprising the step of applying the modulated fuel supply control signal and air supply control signal to respective actuators coupled to said gas turbine.

14. The method of claim 13 wherein said turbine air supply signal is applied to control turbine inlet guide vane angles.

15. The method of claim 13 wherein said fuel supply signal is applied to control the fuel stroke reference signal for said turbine.

* * * * *